United States Patent
Chen et al.

(10) Patent No.: US 11,356,891 B2
(45) Date of Patent: Jun. 7, 2022

(54) CONTROL METHOD FOR DATA TRANSMISSION AND TERMINAL

(71) Applicants: China Mobile Communication Ltd., Research Institute, Beijing (CN); China Mobile Communications Corporation, Beijing (CN)

(72) Inventors: Ningyu Chen, Beijing (CN); Fei Ding, Beijing (CN); Xiaodong Xu, Beijing (CN); Nan Hu, Beijing (CN)

(73) Assignees: China Mobile Communication Ltd., Research Institute, Beijing (CN); China Mobile Communications Corporation, Beijing (CN)

( * ) Notice: Subject to any disclaimer, the term of this patent is extended or adjusted under 35 U.S.C. 154(b) by 625 days.

(21) Appl. No.: 16/321,407

(22) PCT Filed: Sep. 19, 2017

(86) PCT No.: PCT/CN2017/102178
§ 371 (c)(1),
(2) Date: Jan. 28, 2019

(87) PCT Pub. No.: WO2018/059266
PCT Pub. Date: Apr. 5, 2018

(65) Prior Publication Data
US 2021/0306905 A1    Sep. 30, 2021

(30) Foreign Application Priority Data
Sep. 27, 2016 (CN) .......................... 201610855578.4

(51) Int. Cl.
*H04W 48/06* (2009.01)
*H04W 28/02* (2009.01)
(Continued)

(52) U.S. Cl.
CPC ..... *H04W 28/0289* (2013.01); *H04L 47/2475* (2013.01); *H04W 12/08* (2013.01); *H04W 48/06* (2013.01)

(58) Field of Classification Search
CPC . H04W 28/0289; H04W 12/08; H04W 48/06; H04L 47/2475
See application file for complete search history.

(56) References Cited

U.S. PATENT DOCUMENTS

| | | | |
|---|---|---|---|
| 2009/0245176 A1* | 10/2009 | Balasubramanian | H04W 48/20 370/328 |
| 2012/0084460 A1* | 4/2012 | McGinnity | H04L 67/327 709/242 |
| 2017/0295536 A1* | 10/2017 | Kim | H04L 47/2475 |

* cited by examiner

*Primary Examiner* — Minh Trang T Nguyen
(74) *Attorney, Agent, or Firm* — Morgan, Lewis & Bockius LLP

(57) ABSTRACT

A control method for data transmission and a terminal are provided. The control method for data transmission includes: determining, when a terminal has established a user-plane bearer link with a network and before transmitting data to be transmitted, whether or not a destination address of the data to be transmitted is recorded in a pre-created address whitelist; acquiring, if the destination address of the data to be transmitted is not recorded in the address whitelist, an application identifier corresponding to the data to be transmitted, and conducting access control decision based on the application identifier to obtain a decision result; and transmitting, when the decision result indicates that transmission of the data to be transmitted is permitted, the data to be transmitted through the user-plane bearer link.

20 Claims, 2 Drawing Sheets

(51) Int. Cl.
*H04L 47/2475* (2022.01)
*H04W 12/08* (2021.01)

CONTROL METHOD FOR DATA TRANSMISSION AND TERMINAL

CROSS-REFERENCE TO RELATED APPLICATION

This application is the U.S. national phase of PCT Application No. PCT/CN2017/102178 filed on Sep. 19, 2017, which claims a priority to Chinese Patent Application No. 201610855578.4 filed on Sep. 27, 2016, the disclosure of which is incorporated in its entirety by reference herein.

TECHNICAL FIELD

The present disclosure relates to the field of data communication technologies, in particular to a control method for data transmission and a terminal.

BACKGROUND

In data communication, an Application specific Congestion control for Data Communication (ACDC) is an access control mechanism for operators to permit or prohibit an access request from particular applications in User Equipment (UE) when the UE is in idle mode. The ACDC applies only to UEs in idle mode instead of UEs in connected mode. The ACDC is used for alleviating overload of an access network or a core network, and has the following basic characteristics.

1. The ACDC shall be applicable to Universal Mobile Telecommunications System (UMTS) Terrestrial Radio Access Network (URAN) (UTRAN for short) and Evolved UTRAN (E-UTRAN).

2. The home network shall be able to configure a UE with at least four ACDC categories, each of which is associated with an operator-identified application.

3. Configuring the ACDC categories in the UE is the obligation of the home network, and the categorization how to configure the ACDC categories is outside the scope of 3GPP.

4. A mechanism shall be provided that enables the UE to verify that the ACDC categories are configured by a trusted source.

5. The serving network shall be able to broadcast, in an area of the access network, control information including: barring information for each ACDC category, and information about whether a roaming UE shall be subject to ACDC control.

6. The home network shall be able to configure a relationship between applications and the ACDC categories in the UE, since the barring information broadcast in each cell is different.

7. The UE shall be able to control whether or not an access request for a certain application is permitted to be transmitted, based on this broadcasted barring information and a configuration of the ACDC categories in the UE.

8. The serving network shall be able to simultaneously indicate the ACDC and other forms of access control. When the ACDC and an Access Class Barring (ACB) control are indicated simultaneously, the ACDC shall override the ACB.

9. In the case of multiple core networks sharing the same access network, the access network shall be able to apply the ACDC for the different core networks individually. For alleviating congestion in a shared access network, barring rates should be set equal for different operators for fairness.

Each application may be assigned with an application identifier (ID) by an operating system of the UE. The relationship between applications and ACDC categories may be acquired by receiving the broadcasting of the home network by the UE or by writing into a SIM card by the core network in a remote manner. Multiple applications may be associated with one ACDC category.

When configuring the UE with the ACDC categories of applications, the home network shall proceed as follows:

first, applications whose use is expected to be restricted the least shall be assigned with the highest ranked ACDC category, ACDC #1;

second, applications whose use is expected to be restricted more than ACDC #1 applications shall be assigned with the second-to-highest ranked ACDC category, and so on; and third, applications whose use is expected to be restricted the most strictly shall either be assigned the lowest ranked ACDC category, or not be categorized at all.

The applications on the UE that are not assigned with any ACDC category shall be treated by the UE as part of the lowest ACDC category. When applying ACDC, the serving network broadcasts barring information starting from the highest to the lowest ACDC category. The home network and the serving network may use different categorisation manners. The serving network decides if ACDC applies to roaming UEs.

The number of ACDC categories in the UE may not be the same as the number of ACDC categories broadcast by the serving network. This may happen, e.g. when the UE is roaming and the number of ACDC categories broadcast by the serving network is different from the number of ACDC categories configured by the home network. Therefore, the following rules shall apply in this case:

first, if the serving network broadcasts more ACDC categories than the UE's configuration, the UE shall use barring information for the matching ACDC categories, and shall bar uncategorised applications using the barring information for the lowest category broadcast by the serving network, and shall ignore barring information for unmatched categories; and second, if the serving network broadcasts barring information for fewer ACDC categories than the UE's configuration, the UE shall use barring information for the matching ACDC categories and shall bar other applications using the barring information for the lowest category broadcast by the serving network.

Here, the matching ACDC category is an ACDC category for which barring information is broadcast by the serving network and that has the same rank as the ACDC category configured in the UE.

During the ACDC access control procedure in the serving network, barring parameters for different ACDC categories are broadcast sequentially by the serving network, and the barring parameter includes barring time and a barring rate.

Barring time: given that the broadcast barring time for ACDC #1 is 100 ms, for the application a in ACDC category #1, once an access request from the application a is barred by an ACDC policy, the access request from the application a may be barred for 100 ms.

Barring rate: given that the broadcast barring rate for ACDC #2 is 0.6, for the application b in ACDC category #2, the UE generates a random number between 0 and 1 when a connection request is initiated by the application b; the access request is permitted in a case that the random number is less than or equal to 0.6; and the access request is prohibited in a case that the random number is greater than 0.6.

For the conventional ACDC, a service request (SR) including the ACDC category, may be transmitted from a Non Access Stratum (NAS) layer to a lower layer, i.e. Radio Resource Control (RRC) layer before the UE in idle mode initiates a random access procedure. The barring parameters are derived in the RRC layer, and ACDC decision is conducted in the RRC layer.

However, since a user-plane bearer has been established when a UE is in connected mode, the UE may transmit data directly in the application layer, rather than the SR request being transmitted from the NAS layer to the RRC layer. Therefore, new services initiated in connected mode would not experience ACDC.

Since the conventional ACDC applies only to UEs in idle mode instead of UEs in connected mode, it may lead to a free-rider issue: because that admission decision could be made only in idle mode in ACDC, when an application is allowed to access to the network, a RRC connection to the network could be established. No more ACDC decision would be made for the other applications having the lower priorities than the application before the RRC connection is disconnected, and those applications having the lower priorities may bypass the ACDC decision and may directly access the network. It's obvious that the ACDC in related art is not conducive to control and managing different applications individually, and fairness of priorities among the applications.

SUMMARY

The technical problem to be solved by embodiments of the present disclosure is to provide a control method for data transmission and a terminal, for performing access control for applications in a terminal in connected mode, to achieve fairer application priority management and network congestion control.

In order to solve the above mentioned problem, the embodiments of the present disclosure provide a control method for data transmission, including:

determining, when a terminal has established a user-plane bearer link with a network and before transmitting data to be transmitted, whether or not a destination address of the data to be transmitted is recorded in a pre-created address whitelist;

acquiring, if the destination address of the data to be transmitted is not recorded in the address whitelist, an application identifier corresponding to the data to be transmitted, and conducting access control decision based on the application identifier to obtain a decision result; and transmitting, when the decision result indicates that transmission of the data to be transmitted is permitted, the data to be transmitted through the user-plane bearer link.

The embodiments of the present disclosure further provide a terminal, including:

a data filter unit, configured to determine, when the terminal has established a user-plane bearer link with a network and before transmitting data to be transmitted, whether or not a destination address of the data to be transmitted is recorded in a pre-created address whitelist;

an access decision unit, configured to acquire, if the destination address of the data to be transmitted is not recorded in the address whitelist, an application identifier corresponding to the data to be transmitted and conduct access control decision based on the application identifier to obtain a decision result; and a transmitting unit, configured to transmit, when the decision result indicates that transmission of the data to be transmitted is permitted, the data to be transmitted through the user-plane bearer link.

The embodiments of the present disclosure further provide a terminal, including a processor, a storage and a transmitter, where:

by calling and executing program or data stored in the storage, the processor is configured to: determine, when the terminal has established a user-plane bearer link with a network and before transmitting data to be transmitted, whether or not a destination address of the data to be transmitted is recorded in a pre-created address; acquire, if the destination address of the data to be transmitted is not recorded in an address whitelist, an application identifier corresponding to the data to be transmitted, and conduct access control decision based on the application identifier to obtain a decision result; and the transmitter is configured to transmit, when the decision result obtained by the processor indicates that transmission of the data to be transmitted is permitted, the data to be transmitted through the user-plane bearer link.

The embodiments of the present disclosure further provide a computer readable storage medium, storing instructions for executing the following steps:

determining, when a terminal has established a user-plane bearer link with a network and before transmitting data to be transmitted, whether or not a destination address of the data to be transmitted is recorded in a pre-created address whitelist;

acquiring, if the destination address of the data to be transmitted is not recorded in the address whitelist, an application identifier corresponding to the data to be transmitted, and conducting access control decision based on the application identifier to obtain a decision result; and transmitting, when the decision result indicates that transmission of the data to be transmitted is permitted, the data to be transmitted through the user-plane bearer link.

Compared with the related art, the control method for data transmission and the terminal provided by the embodiments of the present disclosure can be used to conduct access control for applications in the UE in connected mode, thereby achieving fairer application priority management and network congestion control, and avoiding a problem that a lower priority application may bypass the ACDC decision and directly access to the network, after a RRC connection is established.

DETAILED DESCRIPTION

To make objectives, technical solutions and advantages of the disclosure clearer, the present disclosure will be described below in combination with the drawings and specific embodiments in detail. In the following description, specific details such as specific configuration and components are merely to facilitate a fully understanding of the embodiments of the present disclosure. Therefore, it will be apparent to those skilled in the art that various modifications and amendments can be made to the embodiments described herein without departing from the scope and the spirit of the present disclosure. Furthermore, in order to make the specification clearer and simpler, detailed description about functions and structures well known in the art will be omitted.

It should be understood that "an embodiment" or "another embodiment" mentioned in the whole specification does not mean that particular features, structures, or characteristics related to the embodiment are included in at least one embodiment of the present disclosure. Therefore, "in an embodiment" or "another embodiment" appearing throughout the specification may not necessarily refer to a same embodiment. In addition, these particular features, structures, or characteristics may be combined in one or more embodiments in any appropriate manner.

It should be understood that, a value of a sequence number of the following processes does not indicate an execution sequence, and an execution sequence of each process depends on its function and internal logic, which shall not constitute any limitation to an implementation process of the embodiments of the present disclosure.

In the embodiments of the present disclosure, a terminal may be a mobile phone (or cell phone) or any other device capable of transmitting or receiving wireless signal, including User Equipment (UE), a Personal Digital Assistant (PDA), a wireless modem, a wireless communication apparatus, a handheld apparatus, a laptop, a cordless telephone, a Wireless Local Loop (WLL) station, a Customer Premise Equipment (CPE) or a mobile intellectual hotspot capable of converting mobile signal into WiFi signal, a smart appliance, or any other device capable of communicating with a mobile communication network voluntarily without human operations.

Figure 1:
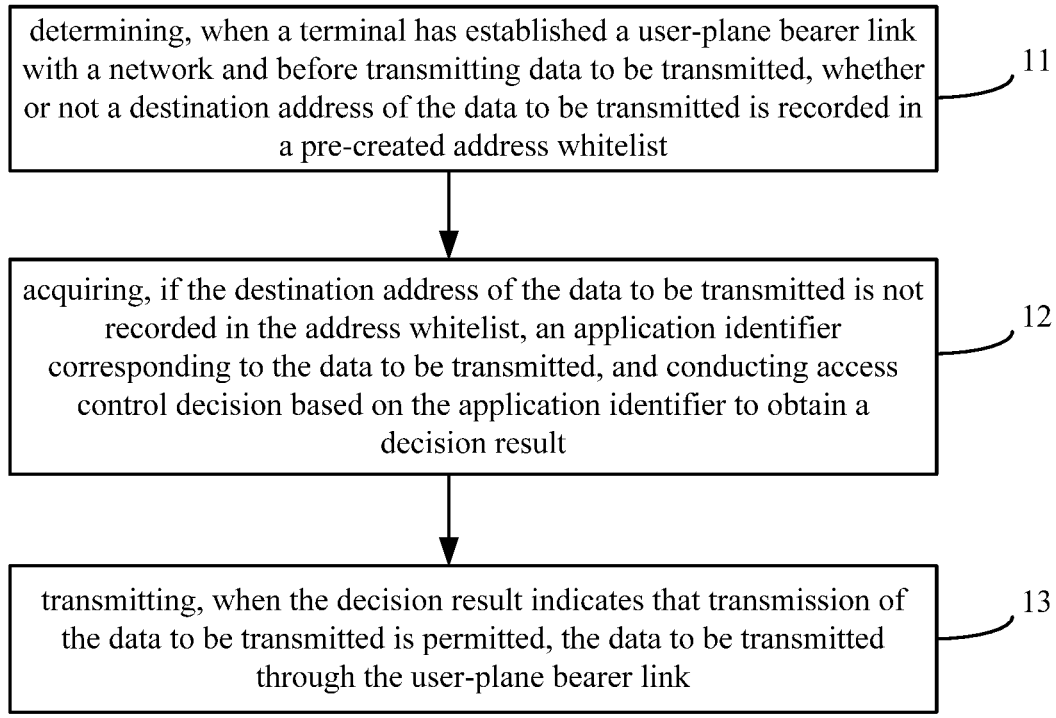
FIG. 1 is a schematic flowchart of a control method for data transmission according to an embodiment of the present disclosure.

Referring to FIG. 1, a control method for data transmission is provided according to an embodiment of the present disclosure. The method includes steps 11 to 13.

Step 11 including: determining, when a terminal has established a user-plane bearer link with a network and before transmitting data to be transmitted, whether or not a destination address of the data to be transmitted is recorded in a pre-created address whitelist.

Here, a user-plane bearer has been established for the terminal and the terminal is in connected mode. The address whitelist may be used for recording destination addresses of data transmitted by applications that have passed access control decision. The destination address may be represented by an IP address in the present disclosure. The address whitelist may be cleared after the user-plane bearer link with the network being established and/or released by the terminal.

Step 12 including: acquiring, if the destination address of the data to be transmitted is not recorded in the address whitelist, an application identifier corresponding to the data to be transmitted, and conducting access control decision based on the application identifier to obtain a decision result.

Here, if the destination address of the data to be transmitted is not recorded in the address whitelist, it is required to further determine whether or not the application that activates the transmission of the data to be transmitted satisfies a preset access control requirement. Specifically, the application identifier corresponding to the data to be transmitted (i.e. the application identifier of the application that activates the transmission of the data to be transmitted) may be acquired, and an ACDC category corresponding to the application identifier may be queried. ACDC decision may be conducted based on the ACDC category corresponding to the application identifier. The relevant art may be referred to for specific implementation of the ACDC decision, which will not be described herein.

Step 13 including: transmitting, when the decision result indicates that transmission of the data to be transmitted is permitted, the data to be transmitted through the user-plane bearer link.

Here, when the decision result indicates that transmission of the data to be transmitted is permitted, the data to be transmitted may be transmitted directly through a pre-established user-plane bearer link. When the decision result indicates that transmission of the data to be transmitted is permitted, the destination address of the data to be transmitted may be added to the address whitelist further to enable decision. In such a manner, in subsequent process of transmitting data with the same destination address, the access control decision on the data directly passes based on the updated address whitelist.

In the embodiments of the present disclosure, access control is performed on applications in the terminal in connected mode in the foregoing steps, which achieves fairer application priority management and network congestion control, and avoids problems that applications having lower priorities bypass the ACDC decision and directly access to network after a RRC connection is established.

In the foregoing method, if it is determined in the above step 11 that the destination address of the data to be transmitted is recorded in the address whitelist, the data to be transmitted may be transmitted then through the user-plane bearer link. If it is determined based on the decision result obtained in the step 12 that transmission of the data to be transmitted is not allowed, the foregoing method further includes: discarding the data to be transmitted.

Further, an address blacklist may be maintained according to the embodiments of the present disclosure. If transmission of the data to be transmitted is not allowed based on the decision result obtained in the above step 12, the destination address of the data to be transmitted may be added to the address blacklist, and an aging timer may be activated. The destination address of the data to be transmitted may be deleted from the address blacklist when a preset value for the aging timer is reached. Here, the preset value may be set based on barring time for ACDC decision. Certainly, the address blacklist may be cleared according to the embodiments of the present disclosure, after the user-plane bearer link with the network has been established and/or released by the terminal.

At this point, the access decision in the above step 12 may include:

determining, if the destination address of the data to be transmitted is not recorded in the address whitelist, whether or not the destination address of the data to be transmitted is recorded in a pre-created address blacklist;

if yes, discarding the data to be transmitted; and if not, acquiring the application identifier corresponding to the data to be transmitted and conducting access control decision based on the application identifier to obtain the decision result.

In the conventional ACDC policy, access control may be conducted for applications requesting to access to the network when UE is in idle mode, however, when one application is allowed to access to the network after ACDC decision for the application has been conducted on terminal side, other applications having the lower priorities than the application may transmit data through the existing bearer, and bypass the ACDC decision, which is not conducive to fairness of priorities among applications. It can be seen that, the conventional ACDC policy may be enhanced by the embodiments of the present disclosure. According to the control method for data transmission provided by the embodiments of the present application, after a signalling connection is established for a certain application, other applications are not capable of directly transmitting data on the existing connection, and the ACDC decision needs to be re-conducted, which ensure fairness of priorities among the applications.

It should be noted that, the "application" in the embodiments of the present disclosure may be a "service".

Figure 2:
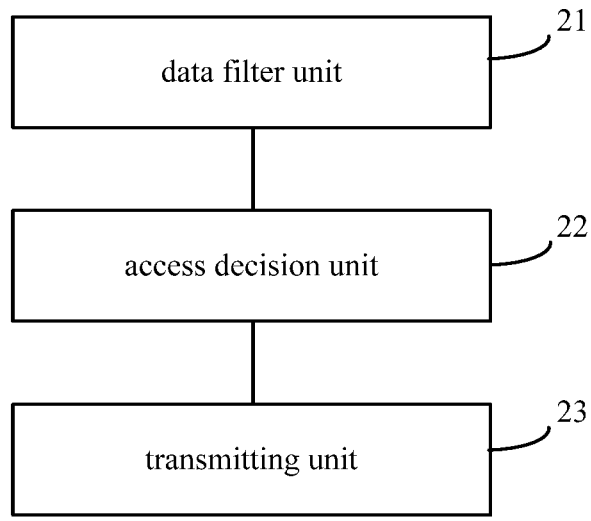
FIG. 2 is a schematic structural diagram of a terminal according to an embodiment of the present disclosure.

An embodiment of the present disclosure further provides a terminal, referring to FIG. 2, and the terminal may include:

a data filter unit 21, configured to determine, when the terminal has established a user-plane bearer link with a network and before transmitting data to be transmitted, whether or not a destination address of the data to be transmitted is recorded in a pre-created address whitelist;

an access decision unit 22, configured to acquire, if the destination address of the data to be transmitted is not recorded in the address whitelist, an application identifier corresponding to the data to be transmitted and conduct access control decision based on the application identifier to obtain a decision result; and a transmitting unit 23, configured to transmit, when the decision result indicates that transmission of the data to be transmitted is permitted, the data to be transmitted through the user-plane bearer link.

Here, the transmitting unit 23 may be further configured to transmit the data to be transmitted through the user-plane bearer link, if the destination address of the data to be transmitted is recorded in the address whitelist. Also, the transmitting unit 23 may be further configured to discard the data to be transmitted, if transmission of the data to be transmitted is not allowed based on the decision result obtained by the access decision unit 22.

The access decision unit 22 may include: an ACDC decision unit, it may be configured to query an ACDC category corresponding to the application identifier, and to conduct ACDC decision based on ACDC category corresponding to the application identifier.

The above terminal may further include: a first address maintaining unit, configured to add, when the decision result obtained by the access decision unit indicates that transmission of the data to be transmitted is permitted, the destination address of the data to be transmitted to the address whitelist.

The above access decision unit 22 may include:

a determining unit, configured to determine, if the destination address of the data to be transmitted is not recorded in the address whitelist, whether or not the destination address of the data to be transmitted is recorded in a pre-created address blacklist; if yes, discard the data to be transmitted; and otherwise, activate an ACDC decision unit; and the ACDC decision unit, configured to acquire, in response to the activating by the determining unit, an application identifier corresponding to the data to be transmitted, and to conduct access control decision based on the application identifier to obtain a decision result.

In order to maintain the address blacklist, the above-mentioned terminal further includes: a second address maintaining unit, configured to add, when the decision result obtained by the access decision unit indicates that transmission of the data to be transmitted is prohibited, the destination address of the data to be transmitted to the address blacklist, and activate an aging timer. The destination address of the data to be transmitted is deleted from the address blacklist when the aging timer reaches a preset value.

In order to maintain the address whitelist, the above-mentioned terminal further includes a third address maintaining unit, configured to clear the address whitelist after establishing and/or releasing the user-plane bearer link with the network by the terminal. Certainly, the third address maintaining unit may be further configured to clear the address blacklist, after the user-plane bearer link with the network has been established and/or released by the terminal.

Figure 3:
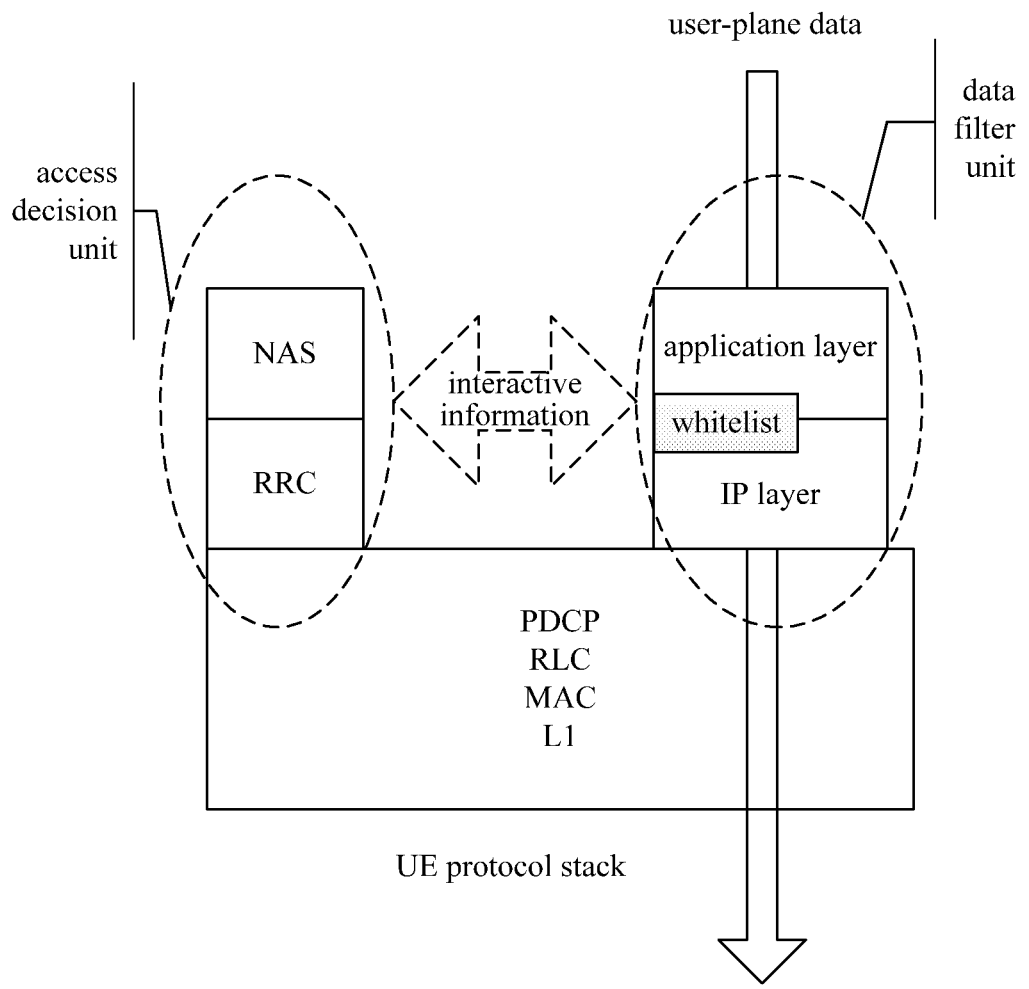
FIG. 3 is a diagram showing a relationship between modules of a terminal and an existing protocol stack architecture of the terminal according to an embodiment of the present disclosure.

Further, a relationship between modules of a terminal and an existing protocol stack architecture of the terminal is shown in FIG. 3. Specifically, the above-mentioned data filter unit may be contained in an IP layer and/or an application layer. The above mentioned access decision unit may be contained in a NAS layer and/or a RRC layer. Depending on the specific location of the access decision unit, different implementations for decision procedure are as followed.

a) A possible implementation for decision procedure is that: an application identifier (APP ID) may be received and a corresponding ACDC category may be queried in the NAS layer, the ACDC category may be transmitted from the NAS layer to the RRC layer, and ACDC decision may be conducted in the RRC layer to obtain a decision result.

b) A possible implementation for decision procedure is that: an APP ID may be received and a corresponding ACDC category may be queried in the NAS layer, and ACDC decision may be conducted in the NAS layer to obtain a decision result.

c) A possible implementation for decision procedure is that: an APP ID may be received and a corresponding ACDC category may be queried in the RRC layer, and ACDC decision may be conducted in the RRC layer to obtain a decision result.

A possible implementation for the foregoing access control of the embodiments of the present disclosure in LTE is based on the Service Data Flow (SDF, referring to protocol 3GPP TS23.401). In traditional LTE, a service data flow may be created in the IP layer by a UE. IP addresses which may match with the service data flow may be transmitted through channels of the service data flow. IP addresses which may not match with the service data should be discarded. Therefore, the whitelist according to the embodiments of the present disclosure is a SDF for matching with the IP address, while the blacklist is a SDF for deleting the IP address.

To sum up, in the embodiments of the present disclosure, ACDC access control may be conducted for applications which request to access to the network in UEs in either idle mode or connected mode, thereby avoiding a free-rider effect. If there is still data to be transmitted by other applications after a first application accesses to the network successfully, admission decision is required to be re-conducted, thereby ensuring fairness of priorities among applications.

An embodiment of the present disclosure further provides a terminal. The terminal may include a processor, a transmitter and a storage. The storage may include a read-only memory or a random access memory, and provide the processor with instructions or data. The processor, transmitter and storage may be coupled with each other by a bus system. In addition a data bus, the bus system may further include a power bus, control bus and status signal bus, and so on. The processor 610 may be a general-purpose processor including a central processing unit (CPU), and a network processor (NP). The processor 601 may be a digital signal processing (DSP), an application specific integrated circuit (ASIC), a field programmable gate array (FPGA) or any other programmable logic device, a discrete gate or transistor logic device, or a discrete hardware component, which is capable of implementing or executing the method steps disclosed in the embodiments of the present disclosure.

In some embodiments, by calling and executing process or data stored in the storage, the processor may be used to determine whether or not the destination address of data to be transmitted is recorded in a pre-created address whitelist, when the terminal has established a user-plane bearer link with a network and before transmitting data to be transmitted; acquire, if the destination address of the data to be transmitted is not recorded in an address whitelist, an application identifier corresponding to the data to be transmitted, and conduct access control decision based on the application identifier to obtain a decision result. The transmitter may be configured to transmit the data to be transmitted through the user-plane bearer link, when the decision result obtained by the processor indicates that transmission of the data to be transmitted is permitted.

The specific implementations may be referred to the foregoing description, which will not be described herein.

It should be noted that the above descriptions are merely preferred embodiments of the present disclosure, and those skilled in the art may make various improvements and refinements without departing from the principle of the present disclosure. All such improvements and refinements are intended to be covered by the present disclosure.

What is claimed is:

1. A control method for data transmission, performed by a terminal, comprising:
   determining, when the terminal has established a user-plane bearer link with a network and before transmitting data to be transmitted, whether or not a destination address of the data to be transmitted is recorded in a pre-created address whitelist;
   acquiring, if the destination address of the data to be transmitted is not recorded in the address whitelist, an application identifier corresponding to the data to be transmitted, and conducting access control decision based on the application identifier to obtain a decision result; and
   transmitting, when the decision result indicates that transmission of the data to be transmitted is permitted, the data to be transmitted through the user-plane bearer link.

2. The control method according to claim 1, wherein the step of conducting access control decision based on the application identifier comprises: querying an access category corresponding to the application identifier, and conducting access control decision based on the access category corresponding to the application identifier.

3. The control method according to claim 1, wherein when the decision result indicates that transmission of the data to be transmitted is permitted, the method further comprises: adding the destination address of the data to be transmitted to the address whitelist.

4. The control method according to claim 1, wherein when the decision result indicates that transmission of the data to be transmitted is prohibited, the method further comprises: discarding the data to be transmitted.

5. The control method according to claim 1, wherein the step of acquiring, if the destination address of the data to be transmitted is not recorded in the address whitelist, an application identifier corresponding to the data to be transmitted, and conducting access control decision based on the application identifier to obtain a decision result comprises:
   determining, if the destination address of the data to be transmitted is not recorded in the address whitelist, whether or not the destination address of the data to be transmitted is recorded in a pre-created address blacklist; if yes, discarding the data to be transmitted; and otherwise, acquiring the application identifier corresponding to the data to be transmitted and conducting access control decision based on the application identifier to obtain the decision result.

6. The control method according to claim 5, wherein when the decision result indicates that transmission of the data to be transmitted is prohibited, the method further comprises:
   adding the destination address of the data to be transmitted to the address blacklist and activating an aging timer, wherein the destination address of the data to be transmitted is deleted from the address blacklist when the aging timer reaches a preset value.

7. The control method according to claim 1, further comprising:
   transmitting, if the destination address of the data to be transmitted is recorded in the address whitelist, the data to be transmitted through the user-plane bearer link.

8. The control method according to claim 1, further comprising:
   clearing the address whitelist after the user-plane bearer link with the network is established and/or released by the terminal.

9. A terminal, comprising a processor, a storage and a transmitter, wherein:
   the processor is configured to call and execute program or data stored in the storage, so as to:
      determine, when the terminal has established a user-plane bearer link with a network and before transmitting data to be transmitted, whether or not a destination address of the data to be transmitted is recorded in a pre-created address whitelist; and
      acquire, if the destination address of the data to be transmitted is not recorded in the address whitelist, an application identifier corresponding to the data to be transmitted and conduct access control decision based on the application identifier to obtain a decision result; and
   the transmitter is configured to transmit, when the decision result obtained by the processor indicates that transmission of the data to be transmitted is permitted, the data to be transmitted through the user-plane bearer link.

10. The terminal according to claim 9, wherein in conducting access control decision based on the application identifier, the processor is configured to:
    query an access category corresponding to the application identifier, and conduct access control decision based on the access category corresponding to the application identifier.

11. The terminal according to claim 9, wherein the processor is further configured to:
    add, when the decision result indicates that transmission of the data to be transmitted is permitted, the destination address of the data to be transmitted to the address whitelist.

12. The terminal according to claim 9, wherein the processor is further configured to: discard the data to be transmitted when the decision result indicates that transmission of the data to be transmitted is prohibited.

13. The terminal according to claim 9, wherein the processor is further configured to:
    determine, if the destination address of the data to be transmitted is not recorded in the address whitelist, whether or not the destination address of the data to be transmitted is recorded in a pre-created address blacklist; if yes, discard the data to be transmitted; and otherwise acquire an application identifier corresponding to the data to be transmitted, and to conduct access control decision based on the application identifier to obtain the decision result.

14. The terminal according to claim 13, wherein the processor is further configured to:
    add, when the decision result indicates that transmission of the data to be transmitted is prohibited, the destination address of the data to be transmitted to the address blacklist, and activate an aging timer, wherein the destination address of the data to be transmitted is deleted from the address blacklist when the aging timer reaches a preset value.

15. The terminal according to claim 9, wherein the transmitter is further configured to:
    transmit, if the destination address of the data to be transmitted is recorded in the address whitelist, the data to be transmitted through the user-plane bearer link.

16. The terminal according to claim 9, wherein the processor is further configured to:
    clear the address whitelist after establishing and/or releasing the user-plane bearer link with the network by the terminal.

17. A non-transitory computer readable storage medium, storing instructions for executing the following steps:
    determining, when a terminal has established a user-plane bearer link with a network and before transmitting data to be transmitted, whether or not a destination address of the data to be transmitted is recorded in a pre-created address whitelist;
    acquiring, if the destination address of the data to be transmitted is not recorded in the address whitelist, an application identifier corresponding to the data to be transmitted, and conducting access control decision based on the application identifier to obtain a decision result; and
    transmitting, when the decision result indicates that transmission of the data to be transmitted is permitted, the data to be transmitted through the user-plane bearer link.

18. The non-transitory computer readable storage medium according to claim 17, wherein the step of conducting access control decision based on the application identifier comprises: querying an access category corresponding to the application identifier, and conducting access control decision based on the access category corresponding to the application identifier.

19. The non-transitory computer readable storage medium according to claim 17, wherein when the decision result indicates that transmission of the data to be transmitted is permitted, the method further comprises: adding the destination address of the data to be transmitted to the address whitelist.

20. The non-transitory computer readable storage medium according to claim 17, wherein when the decision result indicates that transmission of the data to be transmitted is prohibited, the method further comprises: discarding the data to be transmitted.

* * * * *